United States Patent
Klok et al.

(10) Patent No.: US 9,290,611 B2
(45) Date of Patent: Mar. 22, 2016

(54) PRODUCTION AND USE OF POLYMERS COMPRISING HYDROXYL GROUPS AND ACRYLATE GROUPS

(75) Inventors: Harm-Anton Klok, St. Sulpice (CH); Sanhao Ji, Chavannes (CH); Bernd Bruchmann, Freinsheim (DE); Christine Roesch, Oppenheim (DE)

(73) Assignee: BASF SE, Ludwigshafen (DE)

( * ) Notice: Subject to any disclaimer, the term of this patent is extended or adjusted under 35 U.S.C. 154(b) by 476 days.

(21) Appl. No.: 13/382,197

(22) PCT Filed: Jul. 15, 2010

(86) PCT No.: PCT/EP2010/060177
§ 371 (c)(1),
(2), (4) Date: Jan. 4, 2012

(87) PCT Pub. No.: WO2011/006947
PCT Pub. Date: Jan. 20, 2011

(65) Prior Publication Data
US 2012/0129971 A1    May 24, 2012

(30) Foreign Application Priority Data

Jul. 17, 2009  (EP) .................... 09165743
May 10, 2010  (EP) .................... 10162436

(51) Int. Cl.
*C08G 2/26* (2006.01)
*C08G 61/12* (2006.01)
*C08G 2/00* (2006.01)
*C08F 222/10* (2006.01)

(52) U.S. Cl.
CPC  *C08G 61/12* (2013.01); *C08G 2/00* (2013.01); *C08G 2/26* (2013.01); *C08F 222/1006* (2013.01); *C08G 2261/344* (2013.01)

(58) Field of Classification Search
CPC ............ C08G 2/26; C08G 61/12; C08G 2/00; C08G 2261/344; C08F 222/1006
USPC ........... 525/154, 400, 401; 528/245, 246, 392
See application file for complete search history.

(56) References Cited

U.S. PATENT DOCUMENTS

| 5,380,901 A | 1/1995 | Antonucci et al. |
| 5,770,650 A | 6/1998 | McGee et al. |
| 2005/0277708 A1 | 12/2005 | Vanmaele et al. |
| 2006/0009589 A1 | 1/2006 | Haering et al. |
| 2007/0135556 A1 | 6/2007 | Schwalm et al. |
| 2009/0018300 A1 | 1/2009 | Bloom et al. |
| 2011/0275759 A1 | 11/2011 | Klok et al. |

FOREIGN PATENT DOCUMENTS

| DE | 199 57 900 | 6/2001 |
| WO | 2005 057286 | 6/2005 |
| WO | 2006 005491 | 1/2006 |

OTHER PUBLICATIONS

Oehr, K.H., et al.; Glyoxal Production from Biomass Pyrolysis Derived Hydroxyacetaldehyde, 1993, p. 1452-1455.*
Garcia, H.D., et al.; Spacecraft Maximum Allowable Concentrations for Selected Airborne Contaminants, vol. 4, 2000, p. 307.*
International Search Report Issued Oct. 20, 2010 in PCT/EP10/60177 Filed Jul. 15, 2010.

\* cited by examiner

*Primary Examiner* — Robert Jones, Jr.
(74) *Attorney, Agent, or Firm* — Oblon, McClelland, Maier & Neustadt, L.L.P.

(57) ABSTRACT

The present invention relates to polymers which contain hydroxyl groups and acrylate groups, to processes for preparing them, and to their use.

34 Claims, 2 Drawing Sheets

PRODUCTION AND USE OF POLYMERS COMPRISING HYDROXYL GROUPS AND ACRYLATE GROUPS

Figure 1:
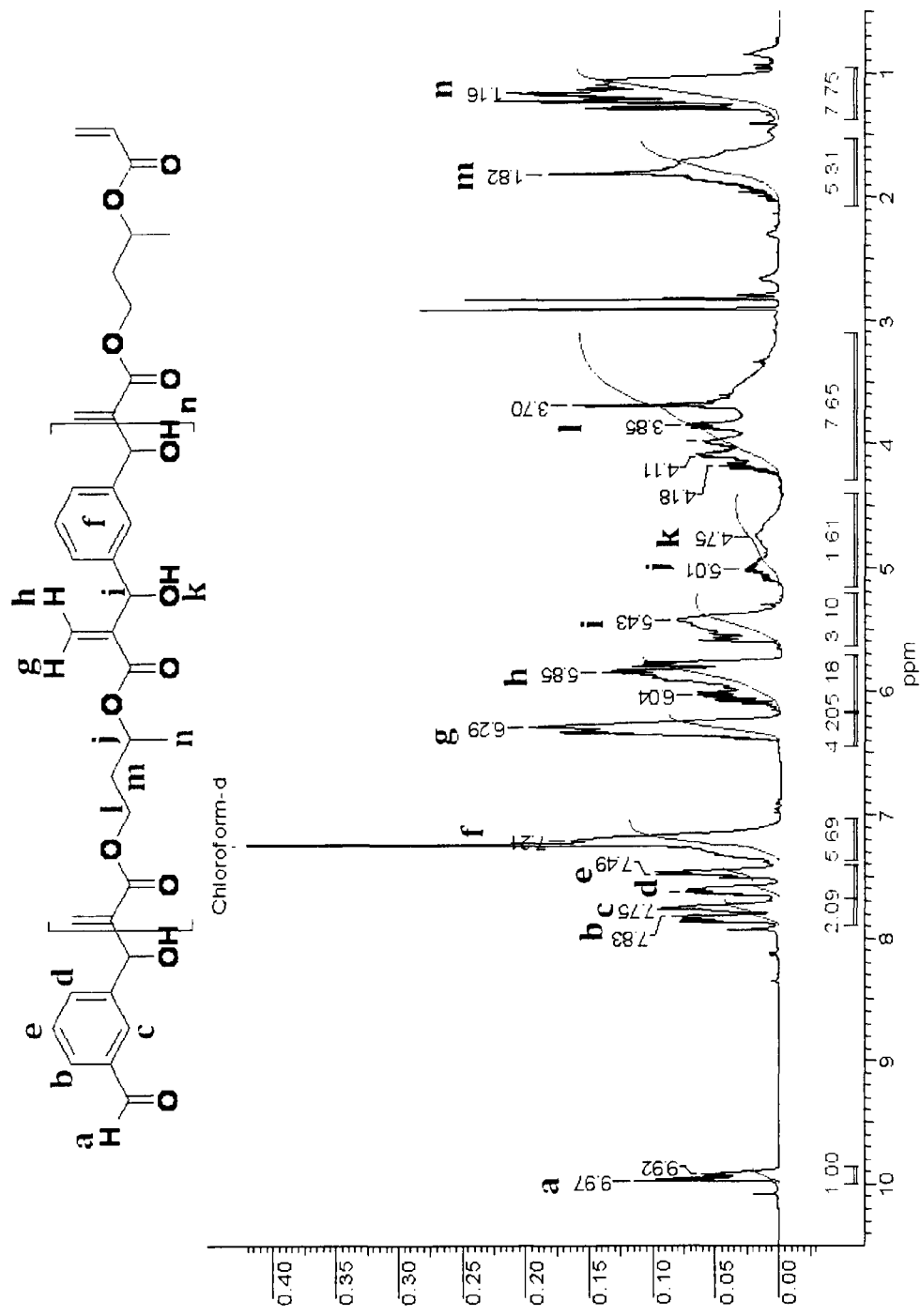

The present invention relates to polymers which contain hydroxyl groups and acrylate groups, to processes for preparing them, and to their use.

The polymers of the invention containing hydroxyl groups and acrylate groups can be prepared with preference via a reaction known as the Baylis-Hillman reaction, in which acrylates and carbonyl compounds, preferably aldehydes, are reacted with one another (see also below).

U.S. Pat. No. 5,380,901 describes the reaction of acrylates with para-formaldehyde to form ether-bridged diacrylates, and also the reaction of diacrylates with formaldehyde to form di($\alpha$-(1'-hydroxyalkyl)) acrylates, and also the potential use of such monomers in—for example—coatings. Bulk polymerization is described as curing.

WO 2005/57286 (corresponding to US 2007/135556) describes the reaction of acrylates with formaldehydes for the purpose of additional introduction of methylol groups into an existing molecule. Described in detail is the reaction of monofunctional acrylates with monofunctional carbonyl compounds, of polyfunctional acrylates with monofunctional carbonyl compounds, and monofunctional acrylates with polyfunctional carbonyl compounds. The aldehydes used as polyfunctional carbonyl compounds may comprise inter alia heteroatoms in the connecting alkylene chain.

P. Venkitasubramanian, E. C. Hagberg, and P. D. Bloom, Polymer Preprints 2008, 49 (1), 914 to 915, and US 2009/0018300 describe the preparation of bio-based polymers on the basis of a monomer which contains an aldehyde group and an acrylate group, from the reaction of 5-hydroxymethylfurfural and acryloyl chloride or methyl acrylate. This monomer is polymerized by means of the Baylis-Hillman reaction.

US 2009/0018300, in the merely "prophetic examples" 19 to 23, discloses the hypothetical preparation of linear polymers through a Baylis-Hillman reaction on the basis of diformylfuran and a furan-based and/or isosorbitol-based diacrylate. Since these hypothetic examples are prepared on the basis of renewable biological materials, the hypothetical products as well are likely to be biodegradable and hence of reduced stability. Moreover, the monomers of the "prophetic examples" are not available industrially, and their preparation is costly and inconvenient.

It was an object of the present invention, therefore, to develop new, technically attractive pathways to the preparation of polymers containing hydroxyl groups and acrylate groups, which can be used either as such or as components for radiation-curable systems, for systems curable by polyaddition or polycondensation, or for systems curable by radiation and via polyaddition or polycondensation, known as dual-cure systems. The polymers ought to give rise to an expectation of improved stability relative to the polymers suggested in the prior art that are preparable hypothetically through a Baylis-Hillman reaction.

This object is achieved by means of polymers (A) which contain hydroxyl groups and acrylate groups and are obtainable by reacting
- at least one dicarbonyl compound (a1) having just two carbonyl groups, selected from the group consisting of
  - aldehyde groups (a1a) and
  - keto groups (a1b)

and
- at least one diacrylate compound (a2), the two carbonyl groups in the compound (a1) being connected to one another through an aliphatic, cycloaliphatic or aromatic hydrocarbon radical or simply through a single bond.

The Baylis-Hillman reaction involves the condensation of an electron-poor alkene and an aldehyde, catalyzed by a tertiary amine or phosphine. The Baylis-Hillman adduct, an $\alpha$-methylene-$\beta$-hydroxy carbonyl derivative, is an interesting and important substructure which occurs frequently in natural and synthetic products of biological and medical interest. The typical Baylis-Hillman reaction uses unhindered nucleophilic tertiary amine catalysts as exemplified by 1,4-diazabicyclo[2.2.2]octane (DABCO) or 2- or 4-dimethylaminopyridine.

Free-radically curable systems are polymerizable compositions which can be cured via free-radically initiated polymerization. Such initiation may take place, for example, via peroxides, azo compounds or oxygen.

Examples of thermally activable initiators are, for example, potassium peroxodisulfate, dibenzoyl peroxide, cyclohexanone peroxide, di-tert-butyl peroxide, cyclohexylsulfonyl acetyl peroxide, diisopropyl percarbonate, tert-butyl peroctoate or benzpinacol, di-tert-butyl peroxide, cumene hydroperoxide, dicumyl peroxide, tert-butyl perbenzoate, azobisisobutyronitrile, silylated pinacols, available commercially, for example, under the trade name ADDID 600 from Wacker, or hydroxyl-containing amine N-oxides, such as 2,2,6,6-tetramethylpiperidine-N-oxyl, 4-hydroxy-2,2,6,6-tetramethylpiperidine-N-oxyl, etc. Further examples of suitable initiators are described in "Polymer Handbook", 2nd edn., Wiley & Sons, New York.

Radiation curing for the purposes of this specification is defined as the polymerization of polymerizable compounds as a consequence of electromagnetic and/or particulate radiation, preferably UV light in the wavelength $\lambda$ range of 200 to 700 nm, but also IR or NIR radiation, and/or electron radiation in the range from 150 to 300 keV, and more preferably with a radiation dose of at least 80, preferably 80 to 3000 mJ/cm$^2$.

The term "dual-cure" or "multi-cure" refers for the purposes of this specification to a curing process which takes place via two or more than two mechanisms selected in particular, for example, from radiation, moisture, chemical, oxidative and/or thermal curing, preferably selected from radiation, moisture, chemical and/or thermal curing, more preferably selected from radiation, chemical and/or thermal curing, and very preferably radiation and chemical curing.

Polyaddition for the purposes of this specification is defined as the polymerization of polymerizable compounds without elimination of smaller molecules as a result of a reaction of, for example, hydroxyl groups (—OH), mercapto groups (—SH) or amino groups (—NRH) with groups that are reactive toward hydroxyl, mercapto or amino groups, examples being isocyanates, capped isocyanates, epoxides, cyclic carbonates or amino resins, preferably isocyanates, epoxides or amino resins, more preferably isocyanates or epoxides, and very preferably isocyanates.

It may also encompass the reaction of double bonds with compounds containing groups that can be subjected to addition reaction with the double bonds, a named example being Michael addition. Primary or secondary amino groups in particular may be mentioned here.

Polycondensation for the purposes of this specification is defined as the polymerization of polymerizable compounds with elimination of smaller molecules as a result of the reaction, for example, of hydroxyl groups (—OH), mercapto groups (—SH) or amino groups (—NRH) with groups that are reactive toward hydroxyl, mercapto or amino groups, examples being carboxylic acids or derivatives thereof, sulfonic acids or derivatives thereof, carbonates, preferably carboxylic acids and derivatives thereof or carbonates, more preferably carboxylic acids, carbonyl halides, and carboxylic anhydrides.

Reactants used for the reaction of the invention are at least one, one to four for example, preferably one to three, more preferably one to two, and very preferably just one difunctional carbonyl compound (a1) and at least one, one to four for example, preferably one to three, more preferably one to two and very preferably just one difunctional acrylate (a2).

The dicarbonyl compound (a1) having just two carbonyl groups is selected in accordance with the invention from the group consisting of aldehyde groups (a1a) and
keto groups (a1b).

Preference among the compounds (a1) is given to diketones and dialdehydes; with particular preference the compound (a1) is a dialdehyde.

In accordance with the invention the two carbonyl groups in the compound (a1) are connected to one another through an aliphatic, cycloaliphatic or aromatic hydrocarbon radical.

The dialdehydes as compounds (a1) are preferably compounds of the formula

OHC—R$^1$—CHO, in which

R$^1$ is an aliphatic, cycloaliphatic or aromatic hydrocarbon radical or a single bond.

R$^1$ is preferably unsubstituted or halogen-, $C_1$-$C_8$-alkyl-, $C_2$-$C_8$-alkenyl-, carboxyl-, carboxy-$C_1$-$C_8$-alkyl-, $C_1$-$C_{20}$-acyl-, $C_1$-$C_8$-alkoxy-, $C_6$-$C_{12}$-aryl-substituted $C_6$-$C_{12}$-arylene, $C_3$-$C_{12}$-cycloalkylene, $C_1$-$C_{20}$-alkylene or a single bond. Particular preference is given to unsubstituted $C_6$-$C_{12}$-arylene, $C_3$-$C_{12}$-cycloalkylene, $C_1$-$C_{20}$-alkylene or a single bond. Very particular preference is given to unsubstituted $C_6$-$C_{12}$-arylene, $C_2$-$C_{20}$-alkylene or a single bond.

$C_1$-$C_{20}$-Alkylene here is linear or branched alkylene, e.g., methylene, 1,2-ethylene, 1,2- or 1,3-propylene, 1,2-, 1,3- or 1,4-butylene, 1,1-dimethyl-1,2-ethylene, 1,2-dimethyl-1,2-ethylene, 1,5-pentylene, 1,6-hexylene, 1,8-octylene, 1,10-decylene or 1,20-eicosylene.

$C_3$-$C_{12}$-Cycloalkylene is for example cyclopropylene, cyclopentylene, cyclohexylene, cyclooctylene or cyclododecylene.

$C_6$-$C_{12}$-Arylene is for example phenylene, naphthylene or biphenylene.

Preferred radicals R$^1$ are a single bond, methylene, 1,2-ethylene, 1,3-propylene, 1,2-propylene, 1,4-butylene, 1,5-pentylene, 1,6-hexylene, 1,2-phenylene, 1,3-phenylene, 1,4-phenylene, 2,3-tolylene, 2,4-tolylene, 2,6-tolylene, 1,2-cyclohexylene, 1,3-cyclohexylene, and 1,4-cyclohexylene.

Particularly preferred radicals R$^1$ are a single bond, 1,2-ethylene, 1,3-propylene, 1,4-butylene, 1,3-phenylene, and 1,4-phenylene.

Preferred compounds (a1) are glyoxal, succinaldehyde, glutaraldehyde, caproaldehyde, phthalaldehyde, isophthalaldehyde, and terephthalaldehyde, particular preference being given to glyoxal, succinaldehyde, glutaraldehyde, isophthalaldehyde, and terephthalaldehyde.

The diacrylate compound (a2) comprises any desired difunctional acrylates, preferably diacrylates of alkanediols or cycloalkanediols and also lower polyalkylene glycols, preferably polyethylene glycols or polypropylene glycols, or—albeit less preferably—difunctional acrylamides of diamines, preferably of linear or branched aliphatic or cycloaliphatic diamines.

The compounds (a2) are preferably those having a molecular weight below 400 g/mol, and more preferably are structurally uniform compounds, i.e., those which have no molecular weight distribution.

The alkanediols may preferably be ethylene glycol, 2,2-dimethyl-1,2-ethanediol, 1,3-propanediol, 1,2-propanediol, 1,2-butanediol, 1,3-butanediol, 1,4-butanediol, 3-methylpentane-1,5-diol, 2-ethylhexane-1,3-diol, 2,4-diethyloctane-1,3-diol, 1,6-hexanediol, neopentyl glycol, 2-ethyl-1,3-propanediol or 2-methyl-1,3-propanediol.

The cycloalkanediols may preferably be 2,2-bis(4-hydroxycyclohexyl)propane, 1,1-, 1,2-, 1,3-, and 1,4-cyclohexanedimethanol, or 1,2-, 1,3- or 1,4-cyclohexanediol.

The polyalkylene glycols may preferably be polyethylene glycols, polypropylene glycols, polyTHF or poly-1,3-propanediol. Particular preference is given to polyethylene glycols or polypropylene glycols as a mixture of the isomers.

Among the polyalkylene glycols, dimers to pentamers are preferred.

The diamines are preferably linear or branched, aliphatic or cycloaliphatic, primary and/or secondary diamines, such as 1,2-diaminoethane, 1,2- or 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 1,12-diaminododecane or piperazine, for example.

Particularly preferred diacrylates (a2) are ethylene glycol diacrylate, 1,2-propanediol diacrylate, 1,3-propanediol diacrylate, 1,3-butanediol diacrylate, 1,4-butanediol diacrylate, 1,6-hexanediol diacrylate, diethylene glycol diacrylate, dipropylene glycol diacrylate, tripropylene glycol diacrylate, N,N'-bisacryloyl-1,2-diaminoethane, N,N$^1$-bisacryloyl-1,6-diaminohexane or N,N'-bisacryloylpiperazine.

Especially preferred compounds are 1,6-hexanediol diacrylate and dipropylene glycol diacrylate.

The implementation of the Baylis-Hillman reaction is known per se to the skilled worker and is subject matter of a number of literature reviews.

The reaction may be implemented at a temperature between 0° C. and 100° C., preferably 20 to 80° C. and more preferably 25° C. to 60° C.

In order to bring ketones to reaction it may be necessary to apply high pressure.

A catalyst used for the reaction is usually a tertiary amine or phosphine, examples being trimethylamine, triethylamine, tri-n-butylamine, ethyldiisopropylamine, methyldiisopropylamine, N-methylmorpholine, N-methylpiperidine, triethanolamine, N,N-dimethylethanolamine, 2-dimethylaminopyridine, 4-dimethylaminopyridine, diazabicyclooctane, 1,5-diazabicyclo[4.3.0]non-5-ene (DBN), 1,8-diazabicyclo[5.4.0]undec-7-ene (DBU), pyrrocoline, quinuclidine, quinidine, trimethylphosphine, triethylphosphine, tri-n-butylphosphine, dimethylphenylphosphine, and, preferably, 1,4-diazabicyclo[2.2.2]octane (DABCO). The catalyst is used in general in amounts of 1 to 100 mol % in respect of acrylic groups, preferably 5-50, more preferably 10-40, and very preferably 15-30 mol %.

The stoichiometry between acrylate groups and carbonyl groups is generally 1:0.05-1.5, preferably 1:0.1-1.3, more preferably 1:0.2-1.0, and very preferably 1:0.4-1.0.

Solvents which can be used for the Baylis-Hillman reaction are preferably water, petroleum ether, ligroin, toluene, benzene, xylene, tetrahydrofuran (THF), diethyl ether, dioxane, a methacrylate, or else the acrylate used for the reaction. The reaction can also be carried out in the absence of a solvent.

Where a methacrylate or the acrylate involved in the reaction (referred to below as (meth)acrylate) is used as solvent, the resultant reaction mixture, which comprises not only the (meth)acrylate used but also polymer of the invention, can be purified or used as it is without separation of the (meth)acrylate, in which case the (meth)acrylate then acts as a reactive diluent or polyfunctional (meth)acrylate (see below).

Purification of the reaction mixture may be omitted, and it would be appreciated that the mixture can of course also be purified by distillation, stripping, acidic, alkaline or neutral scrubbing, filtration, by treatment with ion exchangers, or the like.

The polymers of the invention generally have a number-average molecular weight Mn of 398 to 20 000, preferably of 398 to 10 000, and more preferably of 398 to 5000 g/mol and a weight-average molecular weight Mw of 398 to 50 000, preferably of 398 to 30 000, and more preferably of 398 to 20 000. The molecular weight may be determined on oligomers by determination of the degree of polymerization and subsequent calculation of molecular weight from the individual weights of the monomers or on polymers by gel permeation chromatography with a suitable polymer standard, for example with polymethyl methacrylate as standard and tetrahydrofuran or dimethylformamide as eluent.

Generally speaking, the polymers of the invention are either colorless or have a very slight yellowish coloration, and dissolve well in polar solvents, such as methanol, ethanol, dimethylformamide, dimethylacetamide, ethyl acetate, butyl acetate, tetrahydrofuran, acetone, 2-butanone or toluene.

It is an advantage of the polymers (A) of the invention that they are more stable than the polymers suggested in the prior art on the basis of diformylfuran and a furan-based and/or isosorbitol-based diacrylate. Because the polymers of the invention have a hydrocarbon radical they are less susceptible than the aforementioned polymers to biodegradation, and hence more stable, and also, consequently, more resistant to water. Furthermore, their light fastness is improved over that of the electron-rich furan system, since in the case of the aromatic monomers they possess a less electron-rich construction or, in the case of the aliphatic and cycloaliphatic monomers (a1), they possess a construction which is stable toward irradiation of light.

A key advantage of the invention, furthermore, is the possibility of using a very wide variety of monomers (a1) and (a2). Through this variable synthesis it is possible to tailor molecular weight, polarity, reactivity, and compatibility of the polymers very precisely to the desired system properties of the end product.

Furthermore, the monomers (a1) and (a2) are available industrially and hence the polymers (A) are easy to produce.

The use of difunctional compounds (a1) with difunctional compounds (a2) makes the polymers (A) obtainable in accordance with the invention strictly linear—that is, they exhibit no degree, or only a negligible degree, of branching. A negligible degree of branching is one of below 5%, preferably below 4%, more preferably below 3%, very preferably below 2%, and more particularly below 1%.

In one preferred embodiment the carbonyl compound is used substoichiometrically in relation to the compound containing acrylate groups, hence giving reaction mixtures which comprise the Baylis-Hillman product in a mixture with the acrylate employed. Mixtures of this kind can be used with advantage in coating materials for free-radical or radiation curing and/or dual-cure curing.

For use in radiation curing, the polymers (A) of the invention can be mixed with at least one photoinitiator (P). Typical quantities of 0.1% to 10% by weight of photoinitiator are sufficient, preferably 0.2% to 5% by weight.

As photoinitiators (P) it is possible to use the photoinitiators that are known to the skilled worker. Those contemplated include photoinitiators which are activable with UV light, as are described in WO 2006/005491 A1, page 21 line 18 to page 22 line 2 (corresponding to US 2006/0009589 A1, paragraph [0150]), which is hereby made part of the present disclosure by reference. It will be appreciated that it is also possible to use photoinitiators activable with IR radiation. These photoinitiators frequently comprise a combination of at least one sensitizer dye, more particularly cyanine, xanthylium or thiazine dyes, with at least one coinitiator, examples being boranate salts, sulfonium salts, iodonium salts, sulfones, peroxides, pyridine N-oxides or halomethyltriazines.

In one preferred embodiment, moreover, the polymers of the invention may be mixed with at least one reactive diluent and/or at least one polyfunctional, polymerizable compound and/or further, typical coatings additives, to give radiation-curable coating materials.

Reactive diluents are, for example, esters of (meth)acrylic acid with alcohols having 1 to 20 carbon atoms, examples being methyl (meth)acrylate, ethyl (meth)acrylate, butyl (meth)acrylate, 2-ethylhexyl (meth)acrylate, 2-hydroxyethyl acrylate, 4-hydroxybutyl acrylate, dihydrodicyclopentadienyl acrylate, vinylaromatic compounds, e.g. styrene, divinylbenzene, $\alpha,\beta$-unsaturated nitriles, e.g., acrylonitrile, methacrylonitrile, $\alpha,\beta$-unsaturated aldehydes, e.g., acrolein, methacrolein, vinyl esters, e.g., vinyl acetate, vinyl propionate, halogenated ethylenically unsaturated compounds, e.g., vinyl chloride, vinylidene chloride, conjugated unsaturated compounds, e.g., butadiene, isoprene, chloroprene, monounsaturated compounds, e.g., ethylene, propylene, 1-butene, 2-butene, isobutene, cyclic monounsaturated compounds, e.g., cyclopentene, cyclohexene, cyclododecene, N-vinylformamide, allylacetic acid, vinylacetic acid, monoethylenically unsaturated carboxylic acids having 3 to 8 carbon atoms and their water-soluble alkali metal, alkaline earth metal or ammonium salts, such as, for example, acrylic acid, methacrylic acid, dimethylacrylic acid, ethacrylic acid, maleic acid, citraconic acid, methylenemalonic acid, crotonic acid, fumaric acid, mesaconic acid and itaconic acid, maleic acid, N-vinyipyrrolidone, N-vinyl lactams, such as N-vinylcaprolactam, N-vinyl N-alkyl carboxamides or N-vinyl carboxamides, such as N-vinylacetamide, N-vinyl-N-methylformamide and N-vinyl-N-methylacetamide, or vinyl ethers, e.g., methyl vinyl ether, ethyl vinyl ether, n-propyl vinyl ether, isopropyl vinyl ether, n-butyl vinyl ether, sec-butyl vinyl ether, isobutyl vinyl ether, tert-butyl vinyl ether, 4-hydroxybutyl vinyl ether and mixtures thereof.

(Meth)acrylic in this specification stands as a collective term for methacrylic and acrylic.

Polyfunctional polymerizable compounds are preferably polyfunctional (meth)acrylates which carry at least 2, preferably 3-10, more preferably 3-6, very preferably 3-4 and in particular 3 (meth)acrylate groups, preferably acrylate groups.

These may be, for example, esters of (meth)acrylic acid with polyalcohols having a corresponding hydricity of at least two.

Examples of polyalcohols of this kind are at least dihydric polyols, polyetherols or polyesterols or polyacrylate polyols having an average OH functionality of at least 2, preferably 3 to 10.

Examples of polyalcohols with a hydricity of at least two are for example alkoxylated polyalcohols with a hydricity of at least two of the formulae (IVa) to (IVd),

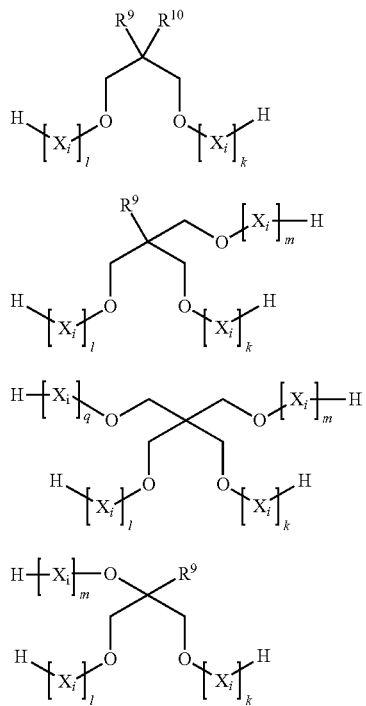

in which

R$^9$ and R$^{10}$ independently of one another are hydrogen or C$_1$-C$_{18}$-alkyl, k, l, m and q independently of one another are each an integer from 1 to 10, preferably from 1 to 5 and more preferably from 1 to 3, and each X$_i$ for i=1 to k, 1 to l, 1 to m and 1 to q can be selected, independently of the others, from the group —CH$_2$—CH$_2$—O—, —CH$_2$—CH(CH$_3$)—O—, —CH(CH$_3$)—CH$_2$—O—, —CH$_2$—C(CH$_3$)$_2$—O—, —C(CH$_3$)$_2$—CH$_2$—O—, —CH$_2$—CHVin-O—, —CHVin-CH$_2$—O—, —CH$_2$—CHPh-O— and —CHPh-CH$_2$—O—, preferably from the group —CH$_2$—CH$_2$—O—, —CH$_2$—CH(CH$_3$)—O— and —CH(CH$_3$)—CH$_2$—O—, and more preferably —CH$_2$—CH$_2$—O—, in which Ph is phenyl and Vin is vinyl.

These compounds are preferably acrylates of singly to vigintuply and more preferably triply to decuply ethoxylated, propoxylated or mixedly ethoxylated and propoxylated and, in particular, exclusively ethoxylated neopentyl glycol, glycerol, trimethylolpropane, trimethylolethane or pentaerythritol.

Preferred compounds (IV) are ethylene glycol diacrylate, 1,2-propanediol diacrylate, 1,3-propanediol diacrylate, 1,3-butanediol diacrylate, 1,4-butanediol diacrylate, 1,6-hexanediol diacrylate, trimethylolpropane triacrylate, pentaerythritol tetraacrylate, polyester polyol acrylates, polyetherol acrylates and triacrylate of singly to vigintuply ethoxylated trimethylolpropane.

Particularly preferred compounds are 1,4-butanediol diacrylate, 1,6-hexanediol diacrylate, trimethylolpropane triacrylate, pentaerythritol tetraacrylate and triacrylate of singly to vigintuply ethoxylated trimethylolpropane.

Examples of suitable alkylene oxides are ethylene oxide, propylene oxide, isobutylene oxide, vinyloxirane and/or styrene oxide.

The alkylene oxide chain may be composed preferably of ethylene oxide, propylene oxide and/or butylene oxide units. A chain of this kind may be composed of one species of an alkylene oxide or of a mixture of alkylene oxides. Where a mixture is used it is possible for the different alkylene oxide units to be present randomly or as a block or blocks of individual species. Preference as alkylene oxide is given to ethylene oxide, propylene oxide or a mixture thereof, particular preference to ethylene oxide or propylene oxide and very particular preference to ethylene oxide.

The number of alkylene oxide units in the chain is, for example, from 1 to 20, preferably from 1 to 10, more preferably 1-5 and in particular 1-3 and with especial preference 1, based on the respective hydroxyl groups of the polyalcohol.

Examples of suitable polyesterols include those already listed above.

The molecular weights M$_n$ of the polyesterols and/or polyetherols are preferably between 100 and 4000 g/mol (M$_n$ determined by gel permeation chromatography using polymethyl methacrylate as standard and tetrahydrofuran as eluent).

Further polyfunctional (meth)acrylates may be polyester (meth)acrylates, epoxy (meth)acrylates, urethane (meth)acrylates, or (meth)acrylated polyacrylates, as listed above as acrylates of (IVa), (IVb) or (IVc). Instead of the (meth)acrylate groups it is also possible to use other free-radically or cationically polymerizable groups.

Urethane (meth)acrylates are obtainable, for example, by reacting polyisocyanates with hydroxyalkyl (meth)acrylates or hydroxyalkyl vinyl ethers and optionally chain extenders such as diols, polyols, diamines, polyamines or dithiols or polythiols.

Preferred polyfunctional (meth)acrylates are trimethylolpropane tri(meth)acrylate, (meth)acrylates of ethoxylated and/or propoxylated trimethylolpropane, pentaerythritol, glycerol or ditrimethylolpropane. Particular preference is given to acrylates of ethoxylated and/or propoxylated trimethylolpropane or pentaerythritol.

As further, typical coatings additives it is possible for example to use antioxidants, stabilizers, activators (accelerators), fillers, pigments, dyes, antistats, flame retardants, thickeners, thixotropic agents, surface-active agents, viscosity modifiers, plasticizers or chelating agents.

As accelerators for the thermal aftercure it is possible to use for example tin octoate, zinc octoate, dibutyltin dilaurate or diazabicyclo[2.2.2]octane.

In addition it is possible to add one or more photochemically and/or thermally activable initiators, examples being potassium peroxodisulfate, dibenzoyl peroxide, cyclohexanone peroxide, di-tert-butyl peroxide, azobisisobutyronitrile, cyclohexylsulfonyl acetyl peroxide, diisopropyl percarbonate, tert-butyl peroctoate or benzpinacol, and also, for example, those thermally activable initiators with a half-life at 80° C. of more than 100 hours, such as di-t-butyl peroxide, cumene hydroperoxide, dicumyl peroxide, t-butyl perbenzoate, silylated pinacols, such as those available commercially under the trade name ADDID 600 from Wacker, or hydroxyl-containing amine N-oxides, such as 2,2,6,6-tetramethylpiperidine-N-oxyl, 4-hydroxy-2,2,6,6-tetramethylpiperidine-N-oxyl, etc.

Other examples of suitable initiators are described in "Polymer Handbook", 2nd ed., Wiley & Sons, New York.

Suitable thickeners besides free-radically (co)polymerized (co)polymers include customary organic and inorganic thickeners such as hydroxymethylcellulose or bentonite.

As chelating agents it is possible for example to use ethylenediamine tetraacetic acid and its salts and also β-diketones.

Suitable fillers include silicates, e.g., silicates obtainable by hydrolysis of silicon tetrachloride, such as Aerosil® from Degussa, siliceous earth, talc, aluminum silicates, magnesium silicates, calcium carbonates, etc.

Suitable stabilizers include typical UV absorbers such as oxanilides, triazines and benzotriazole (the latter obtainable as Tinuvin® products from Ciba-Spezialitätenchemie) and benzophenones. These can be used alone or together with suitable free-radical scavengers, examples of which are sterically hindered amines such as 2,2,6,6-tetramethylpiperidine, 2,6-di-tert-butylpiperidine or derivatives thereof, e.g., bis(2,2,6,6-tetramethyl-4-piperidyl) sebacinate. Stabilizers are used normally in amounts of from 0.1 to 5.0% by weight, based on the solid components present in the formulation.

The polymers (A) of the invention can be used with advantage for dual-cure or multi-cure applications if they further comprise at least one compound (B) having at least one hydroxyl(—OH)-reactive group.

Compounds (B) having at least one hydroxyl(—OH)-reactive group may be, for example, isocyanates, capped isocyanates, epoxides, carboxylic acids or derivatives thereof, carbonates or amino resins, isocyanates, blocked isocyanates and melamine-formaldehyde resins are preferred, isocyanates being particularly preferred.

Isocyanates are for example aliphatic, aromatic, and cycloaliphatic diisocyanates and polyisocyanates having an NCO functionality of at least 1.8, preferably from 1.8 to 5, and more preferably from 2 to 4, and also their isocyanurates, biurets, urethanes, allophanates, and uretdiones.

The diisocyanates are preferably isocyanates having 4 to 20 carbon atoms. Examples of common diisocyanates are aliphatic diisocyanates such as tetramethylene diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4-, or 2,6-diisocyanato-1-methylcyclohexane and also 3 (or 4), 8 (or 9)-bis(isocyanatomethyl)-tricyclo[5.2.1.0$^{2.6}$]decane isomer mixtures and also aromatic diisocyanates such as 2,4- or 2,6-tolylene diisocyanate and the isomer mixtures thereof, m- or p-xylylene diisocyanate, 2,4'- or 4,4'-diisocyanatodiphenylmethane (MDI) and the isomer mixtures thereof, mixtures of 2,4-, 4,4- and oligomeric diisocyanatodiphenylmethanes (polymer MDI), 1,3- or 1,4-phenylene diisocyanate, 1-chloro-2,4-phenylene diisocyanate, 1,5-naphthylene diisocyanate, diphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene or diphenyl ether 4,4'-diisocyanate.

Mixtures of said diisocyanates may also be present.

Suitable polyisocyanates include polyisocyanates containing isocyanurate groups, uretdione diisocyanates, polyisocyanates containing biuret groups, polyisocyanates containing urethane or allophanate groups, polyisocyanates containing oxadiazinetrione or iminooxadiazinedione groups, uretonimine-modified polyisocyanates of straight-chain or branched $C_4$-$C_{20}$ alkylene diisocyanates, cycloaliphatic diisocyanates having 6 to 20 carbon atoms in all or aromatic diisocyanates having 8 to 20 carbon atoms in all, or mixtures thereof.

The diisocyanates and polyisocyanates which can be used preferably have an isocyanate group content (calculated as NCO, molecular weight=42 g/mol) of 10 to 60% by weight, based on the diisocyanate and polyisocyanate (mixture), more preferably 12 to 50% by weight and very preferably 12 to 40% by weight.

Preference is given to aliphatic and/or cycloaliphatic diisocyanates and polyisocyanates, examples being the aliphatic and cycloaliphatic diisocyanates, respectively, that have been mentioned above, or to mixtures thereof.

Hexamethylene diisocyanate, 1,3-bis(isocyanatomethyl)cyclohexane, isophorone diisocyanate, and di(isocyanatocyclohexyl)methane or their polyisocyanates are particularly preferred, isophorone diisocyanate and hexamethylene diisocyanate or their polyisocyanates are very particularly preferred, and hexamethylene diisocyanate or its polyisocyanates are especially preferred.

Preference is extended to
1) polyisocyanates containing isocyanurate groups and derived from aromatic, aliphatic and/or cycloaliphatic diisocyanates. Particularly preferred here are the corresponding aliphatic and/or cycloaliphatic isocyanato isocyanurates and in particular those based on hexamethylene diisocyanate and isophorone diisocyanate. The isocyanurates present are, in particular, trisisocyanatoalkyl or trisisocyanatocycloalkyl isocyanurates, which constitute cyclic trimers of the diisocyanates, or mixtures with their higher homologs containing more than one isocyanurate ring. The isocyanato isocyanurates generally have an NCO content of from 10 to 30% by weight, in particular from 15 to 25% by weight, and an average NCO functionality of from 2.6 to 4.5.
2) Uretdione diisocyanates having aromatically, aliphatically and/or cycloaliphatically attached isocyanate groups, preferably aliphatically and/or cycloaliphatically attached groups, and in particular those derived from hexamethylene diisocyanate or isophorone diisocyanate. Uretdione diisocyanates are cyclic dimerization products of diisocyanates.

In the formulations of the invention the uretdione diisocyanates can be used as a component alone or in a mixture with other polyisocyanates, particularly those specified under 1).
3) Polyisocyanates containing biuret groups and having aromatically, cycloaliphatically or aliphatically, preferably cycloaliphatically or aliphatically, attached isocyanate groups, especially tris(6-isocyanatohexyl)biuret or its mixtures with its higher homologs. These polyisocyanates containing biuret groups generally have an NCO content of from 18 to 22% by weight and an average NCO functionality of from 2.8 to 4.5.
4) Polyisocyanates containing urethane and/or allophanate groups and aromatically, aliphatically or cycloaliphatically, preferably aliphatically or cycloaliphatically, attached isocyanate groups, as are obtainable for example by reacting excess amounts of hexamethylene diisocyanate or of isophorone diisocyanate with monohydric or polyhydric alcohols such as methanol, ethanol, isopropanol, n-propanol, n-butanol, isobutanol, sec-butanol, tert-butanol, n-hexanol, n-heptanol, n-octanol, n-decanol, n-dodecanol (lauryl alcohol), 2-ethylhexanol, n-pentanol, stearyl alcohol, cetyl alcohol, lauryl alcohol, ethylene glycol monomethyl ether, ethylene glycol monoethyl ether, 1,3-propanediol monomethyl ether, cyclopentanol, cyclohexanol, cyclooctanol, cyclododecanol or polyhydric alcohols as listed above for the polyesterols, or mixtures thereof. These polyisocyanates containing urethane and/or allophanate groups generally have an NCO content of from 12 to 20% by weight and an average NCO functionality of from 2.5 to 4.5.

5) Polyisocyanates containing oxadiazinetrione groups, preferably derived from hexamethylene diisocyanate or isophorone diisocyanate. Polyisocyanates of this kind containing oxadiazinetrione groups can be prepared from diisocyanate and carbon dioxide.

6) Polyisocyanates containing iminooxadiazinedione groups, preferably derived from hexamethylene diisocyanate or isophorone diisocyanate. Polyisocyanates of this kind containing iminooxadiazinedione groups can be prepared from diisocyanates by means of specific catalysts.

7) Uretonimine-modified polyisocyanates.

Polyisocyanates 1) to 7) can be used in a mixture, including if desired a mixture with diisocyanates.

The isocyanate groups may also be in blocked form. Examples of suitable blocking agents for NCO groups include oximes, phenols, imidazoles, pyrazoles, pyrazolinones, diketopiperazines, caprolactams, malonic esters or compounds as specified in the publications by Z. W. Wicks, Prog. Org. Coat. 3 (1975) 73-99 and Prog. Org. Coat 9 (1981), 3-28 and also in Houben-Weyl, Methoden der Organischen Chemie, vol. XIV/2, 61 ff. Georg Thieme Verlag, Stuttgart 1963.

By blocking agents or capping agents in this context are meant compounds which convert isocyanate groups into blocked (capped or protected) isocyanate groups which subsequently, below the temperature known as the deblocking temperature, do not exhibit the usual reactions of a free isocyanate group. Compounds of this kind containing blocked isocyanate groups are commonly employed in dual-cure coating materials whose curing is completed via isocyanate group curing.

Epoxide compounds are those containing at least one, preferably containing at least two, preferably two or three, epoxide group(s) in the molecule.

Suitable examples include epoxidized olefins, glycidyl esters (e.g. glycidyl (meth)acrylate) of saturated or unsaturated carboxylic acids or glycidyl ethers of aliphatic or aromatic polyols. Products of this kind are offered commercially in large numbers. Particular preference is given to polyglycidyl compounds of the bisphenol A, F or B type and glycidyl ether of polyfunctional alcohols, e.g., of butanediol, of 1,6-hexanediol, of glycerol and of pentaerythritol. Examples of such polyepoxide compounds are Epikote® 812 (epoxide value: about 0.67 mol/100 g) and Epikote® 828 (epoxide value: about 0.53 mol/100 g), Epikote® 1001, Epikote® 1007 and Epikote® 162 (epoxide value: about 0.61 mol/100 g) from Resolution Performance Products, Rütapox® 0162 (epoxide value: about 0.58 mol/100 g), and Araldit® DY 0397 (epoxide value: about 0.83 mol/100 g) from Vantico AG.

Suitable components (B) further include compounds containing active methylol or alkylalkoxy groups, especially methylalkoxy groups, on amino resin crosslinkers, such as etherified reaction products of formaldehyde with amines, such as melamine, urea, etc., phenol/formaldehyde adducts, siloxane or silane groups and anhydrides, as described for example in U.S. Pat. No. 5,770,650.

Among the preferred amino resins, which are known and widespread industrially, it is possible with particular preference to use urea resins and melamine resins, such as urea-formaldehyde resins, melamine-formaldehyde resins, melamine-phenol-formaldehyde resins or melamine-urea-formaldehyde resins, for example.

Suitable urea resins are those which are obtainable by reacting ureas with aldehydes and which if need be can be modified.

Suitable ureas include urea and N-substituted or N,N'-disubstituted ureas, such as N-methylurea, N-phenylurea, N,N'-dimethylurea, hexamethylenediurea, N,N'-diphenylurea, 1,2-ethylenediurea, 1,3-propylenediurea, diethylenetriurea, dipropylenetriurea, 2-hydroxypropylenediurea, 2-imidazolidinone (ethyleneurea), 2-oxohexahydropyrimidine (propyleneurea) or 2-oxo-5-hydroxyhexahydropyrimidine (5-hydroxypropyleneurea).

Urea resins if need be can be partly or fully modified, for example by reaction with monofunctional or polyfunctional alcohols, ammonia and/or amines (cationically modified urea resins) or with (hydrogen)sulfites (anionically modified urea resins), particular suitability being possessed by the alcohol-modified urea resins.

Suitable alcohols for the modification include $C_1$-C6 alcohols, preferably $C_1$-$C_4$ alcohol and in particular methanol, ethanol, isopropanal, n-propanol, n-butanol, isobutanol and sec-butanol.

Suitable melamine resins are those which are obtainable by reacting melamine with aldehydes and which if need be may be partly or fully modified.

Particularly suitable aldehydes include formaldehyde, acetaldehyde, isobutyraldehyde and glyoxal.

Melamine-formaldehyde resins are reaction products from the reaction of melamine with aldehydes, examples being the aforementioned aldehydes, especially formaldehyde. If need be, the resultant methylol groups are modified by etherification with the abovementioned monohydric or polyhydric alcohols. It is also possible for the melamine-formaldehyde resins to be modified as described above by reaction with amines, amino carboxylic acids or sulfites.

The action of formaldehyde on mixtures of melamine and urea or on mixtures of melamine and phenol produces melamine-urea-formaldehyde resins or, respectively, melamine-phenol-formaldehyde resins which can likewise be used in accordance with the invention.

The amino resins referred to are prepared by methods known per se.

Examples mentioned particularly are melamine-formaldehyde resins, including monomeric or polymeric melamine resins and partly or fully alkylated melamine resins, urea resins, e.g., methylolureas such as formaldehyde-urea resins, alkoxyureas such as butylated formaldehyde-urea resins, but also N-methylolacrylamide emulsions, isobutoxymethylacrylamide emulsions, polyanhydrides, such as polysuccinic anhydride, and siloxanes or silanes, e.g., dimethyldimethoxysilanes.

Particular preference is given to amino resins such as melamine-formaldehyde resins or formaldehyde-urea resins.

Likewise disclosed is a method of coating substrates using a coating composition of the invention.

The coating of the substrates is in accordance with customary methods which are known to the skilled worker, in which at least one coating composition of the invention or coating formulation comprising it is applied to the target substrate in the desired thickness and the volatile constituents of the coating composition are removed, optionally with heating. This operation can be repeated one or more times if desired. Application to the substrate may take place in a known way, for example, by spraying, troweling, knifecoating, brushing, rolling, roller coating or pouring. The coating thickness is generally in a range from about 3 to 1000 g/m² and preferably from 10 to 200 g/m².

Disclosed in addition is a method of coating substrates which involves if desired adding further typical coatings additives and thermally curable resins to the coating compositions of the invention or to coating formulations comprising them, applying the resultant systems to the substrate, and drying them if desired, and curing them with electron beams or by UV exposure under an oxygen-containing atmosphere or preferably under inert gas, if need be at temperatures up to the level of the drying temperature, and subsequently subjecting them to thermal treatment at temperatures up to 160° C., preferably between 60 and 160° C.

The method of coating substrates can also be conducted such that application of the inventive coating composition or coating formulations is followed first by their thermal treatment at temperatures up to 160° C., preferably between 60 and 160° C., and subsequently by curing with electron beams or by UV exposure under oxygen or preferably under inert gas.

Curing of the films formed on the substrate can if desired take place by means of heat alone. Generally speaking and preferably, however, the coatings are cured both by exposure to high-energy radiation and thermally.

If two or more coats of the coating material are applied one above another it is possible if desired for each coating operation to be followed by a thermal and/or radiation cure.

Examples of suitable radiation sources for the radiation cure include low pressure mercury lamps, medium pressure mercury lamps, and high pressure mercury lamps, and also fluorescent tubes, pulsed lamps, metal halide lamps, electronic flash devices, which allow radiation curing without a photoinitiator, or excimer emitters. The radiation cure is effected by exposure to high-energy radiation, i.e., UV radiation or daylight, preferably light in the wavelength ($\lambda$) range of 200 to 700 nm, more preferably 200 to 500 nm, and very preferably 250 to 400 nm, or by irradiation with high-energy electrons (electron beams; 150 to 300 keV). Radiation sources used are for example high pressure mercury vapor lamps, lasers, pulsed lamps (flashlight), halogen lamps or excimer emitters. The radiation dose normally sufficient for crosslinking in the case of UV curing is in the range from 80 to 3000 mJ/cm².

It is of course also possible to use two or more radiation sources for curing, e.g., two to four.

The sources may also each emit in different wavelength ranges.

In addition to or instead of the thermal cure, curing may also be effected by means of NIR radiation, which here means electromagnetic radiation in the wavelength range from 760 nm to 2.5 µm, preferably from 900 to 1500 nm. Curing by radiation typically requires a suitable photoinitiator with an absorption in the region of the irradiated wavelength.

If desired, irradiation can also be carried out in the absence of oxygen, e.g., under an inert gas atmosphere. Suitable inert gases include preferably nitrogen, noble gases, carbon dioxide, or combustion gases. Irradiation may also be performed with the coating composition covered with transparent media. Examples of transparent media are polymer films, glass or liquids, e.g., water. Particular preference is given to irradiation in the manner described in DE-A1 199 57 900.

The invention further provides a method of coating substrates which comprises i) coating a substrate with a coating composition as described above, ii) removing volatile constituents of the coating composition in order to form a film, under conditions in which the initiator (P) as yet essentially forms no free radicals, iii) if desired, subjecting the film formed in step ii) to high-energy radiation, in the course of which the film is precured, and subsequently machining the article coated with the precured film, if desired, or contacting the surface of the precured film with another substrate, and iv) subjecting the film to a final thermal cure.

Steps iv) and iii) may also be carried out in the opposite order, i.e., the film can be cured first thermally and then with high-energy radiation.

The coating compositions and formulations of the invention are particularly suitable for the coating of substrates such as wood, paper, textile, leather, nonwoven, plastics surfaces, glass, ceramic, mineral building materials, such as cement blocks and fiber cement slabs, or coated or uncoated metals, preferably for the coating of plastics or metals, possibly in the form of films or foils, for example.

With particular preference the coating compositions of the invention are suitable as or in exterior coatings, i.e., in those applications where they are exposed to daylight, preferably on buildings or parts of buildings, interior coatings, traffic markings, coatings on vehicles and aircraft. The coating compositions of the invention are employed in particular as or in automotive clearcoat and topcoat material(s).

The invention further provides for the use of the polymers (A) of the invention in coating compositions for dual-cure applications.

The invention further provides for the use of the polymers (A) of the invention in radiation curing.

The examples which follow illustrate the properties of the invention.

All of the reactants and solvents were used in the commercially available purities as obtained. Reactants were used from Sigma Aldrich (Buchs, Switzerland). Deuterated solvents for NMR were acquired from Armar Chemicals (Döttigen, Switzerland).

Gel permeation chromatography (GPC) was carried out using a Waters Alliance GPCV 2000 System with refractive index, differential viscometer, and light scattering detector. Separation was performed at 60° C. on TSK-Gel Alpha 2500+ 3000+4000 columns using vacuum-distilled dimethylformamide (HPLC purity) with 0.5 g/l LiCl as eluent or with anhydrous THF, at a flow rate of 0.6 ml/min. Molecular weights were determined using a universal calibration curve plotted using a poly(methyl methacrylate) (PMMA) standard with a low polydispersity. The results were calculated using the Empower Pro multidetection GPC software (Version 5.00). The volume within the detector was adjusted on the basis of the position of the signals of uniform PEG oligomers. The volume of the injector loop was 0.214 ml, and the polymer concentration was calculated such that the viscometric signal was less than 0.5% of the baseline.

NMR spectra: Bruker ARX-400 spectrometer at 400 MHz. $CDCl_3$ was used as the solvent. For $^1H$ NMR spectra: the chemical shift was specified relative to the residue signal of the solvent as an internal standard ($CDCl_3$: 7.25 ppm). $^1H$ assignments were confirmed by means of 2D-COSY-45 spectra. Coupling constants J in Hz.

Glass transition temperatures were determined using a Setaram DSC 131 differential scanning calorimeter on 3-5 mg sample quantities, with the heating rate at 5° C. per min and with measurement under $N_2$.

EXAMPLE 1

Polymer of 1,3-butanediol diacrylate and isophthalaldehyde

A stirred mixture of isophthalaldehyde (134 mg, 1.0 mmol) and 1,3-butanediol diacrylate (177 µl, 1.0 mmol) was admixed with quinuclidine (111 mg, 1.0 mmol) and methanol (60 µl, 1.5 mmol). 0.2 ml of THF was added in order to dissolve the reactants. The homogeneous reaction mixture was stirred at ambient temperature and the progress of the reaction was monitored by $^1$H NMR and GPC. After a stirring time of 24 h, the reaction mixture was diluted with chloroform and extracted with saturated sodium chloride solution. After the chloroform phase had been dried over $Na_2SO_4$, the solvent was removed under reduced pressure. The product of the invention had the following characteristic data:

$^1$H NMR (400 MHz, $CDCl_3$): 9.97 (CHO), 7.83 (CH phenyl), 7.75 (CH phenyl), 7.63 (CH phenyl), 7.49 (CH phenyl), 7.21 (CH phenyl), 6.29 (=$CH_2$), 5.85 (=$CH_2$), 5.43 (—C$\underline{H}$—OH), 5.01 (—C$\underline{H}$—$CH_3$), 4.75 (—OH), 3.7 (—O—C$\underline{H}_2$—$CH_2$—), 1.82 (—O—$CH_2$—C$\underline{H}_2$—), 1.16 (—CH—C$\underline{H}_3$)

Molecular weights, determined by GPC in DMF: Mn=1580, Mw=2650

The structure of the polymer prepared was confirmed by $^1$H NMR spectroscopy, as shown FIG. 1.

EXAMPLE 2

Polymer of 1,3-butanediol diacrylate and terephthalaldehyde

A stirred mixture of terephthalaldehyde (134 mg, 1.0 mmol) and 1,3-butanediol diacrylate (177 µl, 1.0 mmol) was admixed with quinuclidine (111 mg, 1.0 mmol) and methanol (60 µl, 1.5 mmol). 0.2 ml of THF was added in order to dissolve the reactants. The homogeneous reaction mixture was stirred at ambient temperature and the progress of the reaction was monitored by $^1$H NMR and GPC. After a stirring time of 24 h, the reaction mixture was diluted with chloroform and extracted with saturated sodium chloride solution. After the chloroform phase had been dried over $Na_2SO_4$, the solvent was removed under reduced pressure. The product of the invention had the following characteristic data:

$^1$H NMR (400 MHz, $CDCl_3$): 9.96 (CHO), 7.82 (CH phenyl), 7.52 (CH phenyl), 7.24 (CH phenyl), 6.28 (=$CH_2$), 5.82 (=$CH_2$), 5.42 (—C$\underline{H}$—OH), 4.97 (—C$\underline{H}$—$CH_3$), 4.77 (—OH), 3.69 (—O—C$\underline{H}_2$—$CH_2$—), 1.81 (—O—$CH_2$—C$\underline{H}_2$—), 1.19 (—CH—C$\underline{H}_3$)

Molecular weights, determined by GPC in DMF: Mn=1530, Mw=2470

Figure 2:
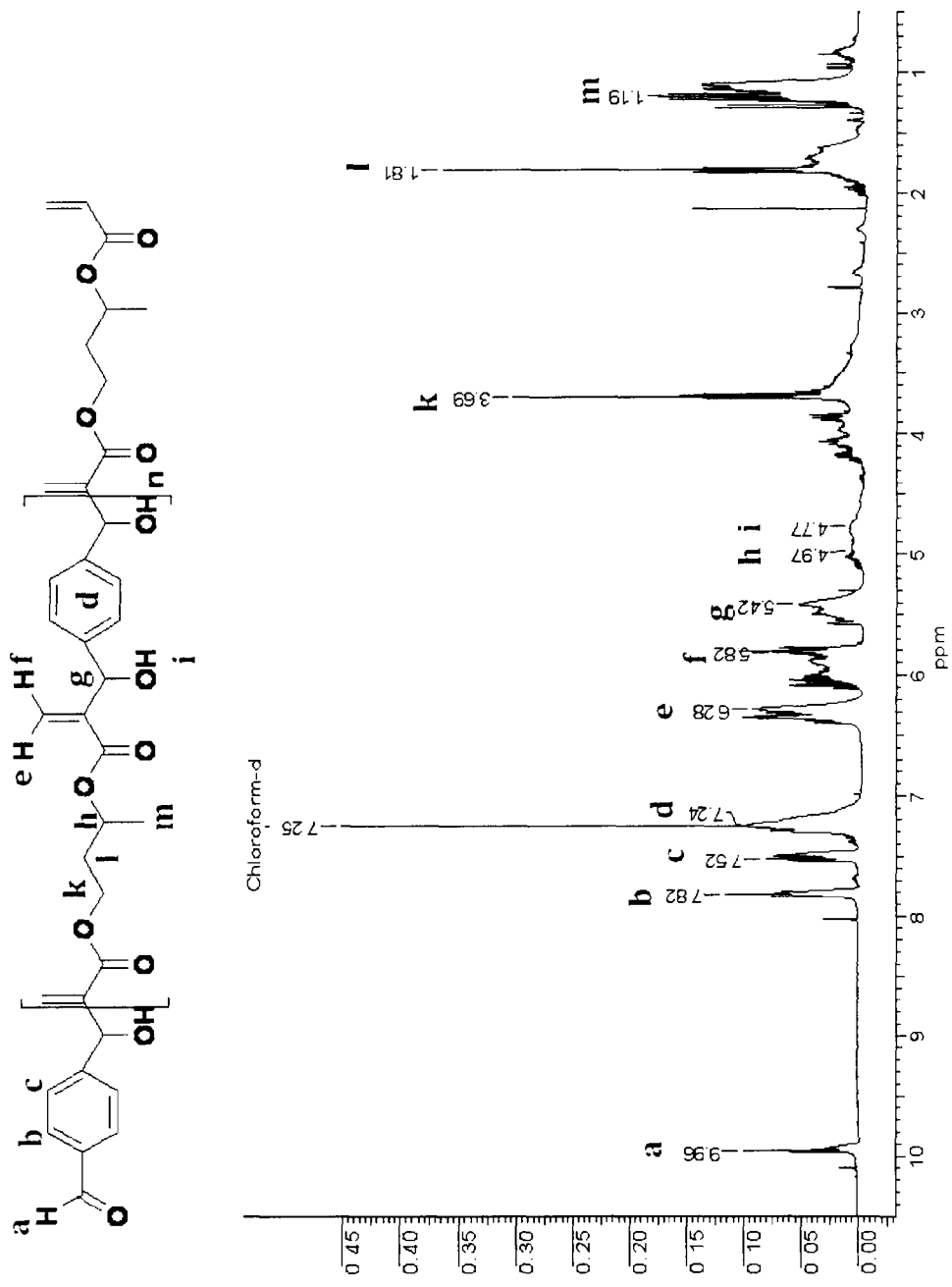

The structure of the polymer prepared was confirmed by $^1$H NMR spectroscopy, as shown in FIG. 2.

EXAMPLE 3

Polymer of 1,3-butanediol diacrylate and terephthalaldehyde

A stirred mixture of terephthalaldehyde (6.1784 g, 45.6 mmol) and 1,3-butanediol diacrylate (8.95 ml, 45.6 mmol) was admixed with DABCO (5 g, 45 mmol) and methanol (2.5 ml). 7 ml of THF were added in order to dissolve the reactants. The homogeneous reaction mixture was stirred at ambient temperature and the progress of the reaction was monitored by $^1$H NMR and GPC. After 24 h, the reaction mixture was diluted with chloroform and extracted with saturated sodium chloride solution. After drying over $Na_2SO_4$, the solvent was removed under reduced pressure to give the desired product. The product of the invention had the following characteristic data: Molecular weights, determined by GPC in THF: Mn: 1228, Mw: 2233, Tg: +1° C.

Investigations of the UV-crosslinkability of the polymers of the invention

EXAMPLE 4

A formulation was prepared from 50 parts by weight of polymer from example 3, 50 parts by weight of butyl acetate and 4 parts by weight of diphenyl(2,4,6-trimethylbenzoyl)phosphine oxide (Lucirin® TPO, BASF SE, Ludwigshafen, Germany, CAS No. 75980-60-8) and was applied using a box-section doctor knife with a 100 µm slot width to a glass substrate. After the solvent had been flashed (15 minutes at 23° C., 20 minutes at 80° C.), the film was exposed at 80° C. in a nitrogen atmosphere at 2800 $mJ/cm^2$ (high-pressure Hg lamp).

The cured film swelled on contact with acetone and underwent partial detachment from the substrate, which is an indicator of incomplete crosslinking.

EXAMPLE 5

A formulation was prepared from 90 parts by weight of polymer from example 3, 10 parts by weight of hexanediol diacrylate and 4 parts by weight of Lucirin® TPO, diluted with 69 parts by weight of butyl acetate, and applied with the aid of a box-section coating knife with a slot width of 100 µm to a glass substrate. After the solvent had been flashed (15 minutes 23° C., 20 minutes 80° C.), the film was exposed at 80° C. in a nitrogen atmosphere at 2800 $mJ/cm^2$ (high-pressure Hg lamp).

The cured film was crosslinked and showed no swelling and no dissolution on contact with acetone.

LIST OF FIGURES

FIG. 1: $^1$H NMR spectrum of the polymer from example 1
FIG. 2: $^1$H NMR spectrum of the polymer from example 2

The invention claimed is:
1. A polymer, comprising:
a hydroxyl group; and
an acrylate group;
wherein:
the polymer is a reaction product of a dicarbonyl compound with a diacrylate compound;
the dicarbonyl compound comprises just two carbonyl groups, each independently selected from the group consisting of an aldehyde group and a keto group, bonded to one another through a substituted or unsubstituted $C_1$-$C_8$-alkyl, a substituted or unsubstituted $C_2$-$C_8$-alkenyl, a substituted or unsubstituted carboxy-$C_1$-$C_8$-alkyl, a substituted or unsubstituted $C_6$-$C_{12}$-aryl, a substituted or unsubstituted $C_6$-$C_{12}$-arylene, a substituted or unsubstituted $C_3$-$C_{12}$-cycloalkylene, or a substituted or unsubstituted $C_1$-$C_{20}$-alkylene; and
the dicarbonyl compound and the diacrylate compound are reacted in the presence of at least one tertiary amine or phosphine selected from the group consisting of trimethylamine, triethylamine, tri-n-butylamine, ethyldiisopropylamine, methyldiisopropylamine, N-methylmorpholine, N-methylpiperidine, triethanolamine, N,N-dimethylethanolamine, 2 dimethylaminopyridine,

4-dimethylaminopyridine, diazabicyclooctane, 1,5 diazabicyclo[4.3.0]non-5-ene (DBN), 1,8-diazabicyclo [5.4.0]undec-7-ene (DBU), pyrrocoline, quinuclidine, quinidine, trimethylphosphine, triethylphosphine, tri-n butylphosphine, dimethylphenylphosphine, and 1,4 diazabicyclo[2.2.2]octane (DABCO).

2. The polymer of claim 1, wherein the two carbonyl groups are bonded to one another through a unsubstituted $C_6$-$C_{12}$-arylene, a substituted or unsubstituted $C_3$-$C_{12}$-cycloalkylene, or a substituted or unsubstituted $C_1$-$C_{20}$-alkylene.

3. The polymer of claim 1, wherein the dicarbonyl compound is a dialdehyde.

4. The polymer of claim 3, wherein the dialdehyde is of formula:

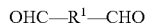

wherein $R^1$ is a substituted or unsubstituted $C_1$-$C_8$-alkyl, a substituted or unsubstituted $C_2$-$C_8$-alkenyl, a substituted or unsubstituted carboxy-$C_1$-$C_8$-alkyl, a substituted or unsubstituted $C_6$-$C_{12}$-aryl, a substituted or unsubstituted $C_6$-$C_{12}$-arylene, a substituted or unsubstituted $C_3$-$C_{12}$-cycloalkylene, or a substituted or unsubstituted $C_1$-$C_{20}$-alkylene.

5. The polymer of claim 1, wherein the dicarbonyl compound is selected from the group consisting of succinaldehyde, glutaraldehyde, phthalaldehyde, isophthalaldehyde, and terephthalaldehyde.

6. The polymer of claim 1, wherein the diacrylate compound comprises at least one selected from the group consisting of a difunctional acrylate of an alkanediol, a difunctional acrylate of a cycloalkane diol, a difunctional acrylate of a lower polyalkylene glycol, and a difunctional acrylate of a diamine.

7. The polymer of claim 1, wherein the diacrylate compound is at least one diacrylate compound selected from the group consisting of ethylene glycol diacrylate, 1,2-propanediol diacrylate, 1,3-propanediol diacrylate, 1,3-butanediol diacrylate, 1,4-butanediol diacrylate, 1,6-hexanediol diacrylate, diethylene glycol diacrylate, dipropylene glycol diacrylate, tripropylene glycol diacrylate, N,N'-bisacryloyl-2,2-diaminoethane, N,N'-bisacryloyl-1,6-diaminohexane, and N,N'-bisacryloylpiperazine.

8. A process of preparing the polymer of claim 1, comprising:
reacting the dicarbonyl compound with the diacrylate compound at a temperature of from 0° C. to 100° C. in a stoichiometric ratio of acrylate groups to carbonyl compounds of from 1:0.05 to 1:1.5.

9. A radiation curing process, comprising curing with the polymer of claim 1.

10. A dual-cure application process, comprising curing with the polymer of claim 1.

11. A coating material for free-radical curing, radiation curing, dual-cure curing, or a combination thereof, comprising the polymer of claim 1.

12. The process of claim 8, comprising reacting the dicarbonyl compound with the diacrylate compound in the presence of a solvent.

13. The process of claim 9, comprising curing with UV light having a wavelength of from 200 nm to 700 nm.

14. The polymer of claim 4, wherein $R^1$ is a $C_6$-$C_{12}$-arylene, a $C_3$-$C_{12}$-cycloalkylene, or a $C_1$-$C_{20}$-alkylene, any of which is optionally substituted with a halogen, a $C_1$-$C_8$-alkyl group, a $C_2$-$C_8$-alkenyl group, a carboxyl group, a carboxy-$C_1$-$C_8$-alkyl group, a $C_1$-$C_{20}$-acyl group, a $C_1$-$C_8$-alkoxy group, or a $C_6$-$C_{12}$-aryl group.

15. The polymer of claim 14, wherein $R^1$ is an unsubstituted $C_6$-$C_{12}$-arylene, an unsubstituted $C_3$-$C_{12}$-cycloalkylene, or an unsubstituted $C_1$-$C_{20}$-alkylene.

16. The polymer of claim 15, wherein $R^1$ is an unsubstituted $C_6$-$C_{12}$-arylene or an unsubstituted $C_2$-$C_{20}$-alkylene.

17. The process of claim 8, wherein an amount of the tertiary amine or phosphine is from 1 to 100 mol % with respect to acrylic groups.

18. The polymer of claim 1, wherein the dicarbonyl compound is selected from the group consisting of isophthalaldehyde and terephthalaldehyde.

19. The polymer of claim 15, wherein $R^1$ is an unsubstituted $C_6$-$C_{12}$-arylene or an unsubstituted $C_2$-$C_{20}$-alkylene.

20. A polymer, comprising:
a hydroxyl group; and
an acrylate group;
wherein:
the polymer is a reaction product of a dialdehyde compound with a diacrylate compound; and
the dialdehyde compound is of formula:

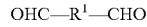

wherein $R^1$ is an unsubstituted $C_6$-$C_{12}$-arylene or an unsubstituted $C_2$-$C_{20}$-alkylene.

21. The polymer of claim 20, wherein the dialdehyde compound is selected from the group consisting of succinaldehyde, glutaraldehyde, phthalaldehyde, isophthalaldehyde, and terephthalaldehyde.

22. The polymer of claim 20, wherein the diacrylate compound comprises at least one selected from the group consisting of a difunctional acrylate of an alkanediol, a difunctional acrylate of a cycloalkane diol, a difunctional acrylate of a lower polyalkylene glycol, and a difunctional acrylate of a diamine.

23. The polymer of claim 20, wherein the diacrylate compound is at least one diacrylate compound selected from the group consisting of ethylene glycol diacrylate, 1,2-propanediol diacrylate, 1,3-propanediol diacrylate, 1,3-butanediol diacrylate, 1,4-butanediol diacrylate, 1,6-hexanediol diacrylate, diethylene glycol diacrylate, dipropylene glycol diacrylate, tripropylene glycol diacrylate, N,N-bisacryloyl-2,2-diaminoethane, N,N'-bisacryloyl-1,6-diaminohexane, and N,N'-bisacryloylpiperazine.

24. A process of preparing the polymer of claim 20, comprising:
reacting the dialdehyde compound with the diacrylate compound at a temperature of from 0° C. to 100° C., in the presence of a tertiary amine or phosphine, in a stoichiometric ratio of acrylate groups to carbonyl compounds of from 1:0.05 to 1:1.5.

25. A radiation curing process, comprising curing with the polymer of claim 20.

26. A dual-cure application process, comprising curing with the polymer of claim 20.

27. A coating material for free-radical curing, radiation curing, dual-cure curing, or a combination thereof, comprising the polymer of claim 20.

28. The process of claim 24, wherein reacting the dialdehyde compound with the diacrylate compound is in the presence of a solvent.

29. The process of claim 25, comprising curing with UV light having a wavelength of from 200 nm to 700 nm.

30. The polymer of claim 20, wherein $R^1$ is an unsubstituted $C_6$-$C_{12}$-arylene.

31. The polymer of claim 20, wherein $R^1$ is an unsubstituted $C_2$-$C_{20}$-alkylene.

32. The process of claim 24, wherein reacting the dialdehyde compound and the diacrylate compound is in the presence of at least one tertiary amine or phosphine selected from the group consisting of trimethylamine, triethylamine, tri-n-butylamine, ethyldiisopropylamine, methyldiisopropylamine, N-methylmorpholine, N-methylpiperidine, triethanolamine, N,N-dimethylethanolamine, 2-dimethylaminopyridine, 4-dimethylaminopyridine, diazabicyclooctane, 1,5-diazabicyclo[4.3.0]non-5-ene (DBN), 1,8-diazabicyclo[5.4.0]undec-7-ene (DBU), pyrrocoline, quinuclidine, quinidine, trimethylphosphine, triethylphosphine, tri-n-butylphosphine, dimethylphenylphosphine, and 1,4-diazabicyclo[2.2.2]octane (DABCO).

33. The process of claim 24, wherein an amount of the tertiary amine or phosphine is from 1 to 100 mol % with respect to acrylic groups.

34. The polymer of claim 20, wherein the dialdehyde compound is selected from the group consisting of isophthalaldehyde and terephthalaldehyde.

\* \* \* \* \*